Oct. 30, 1962  W. ASLAN  3,060,970
FLUID VALVE CONSTRUCTION
Filed Feb. 24, 1960
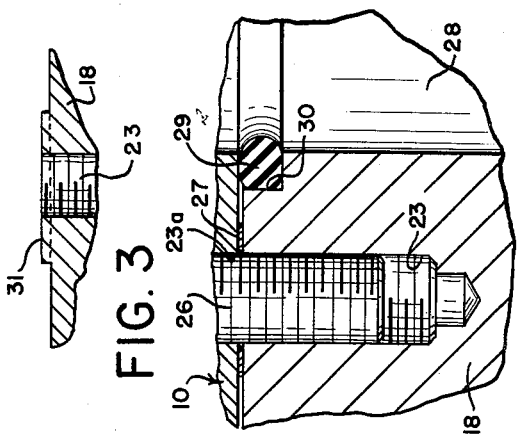
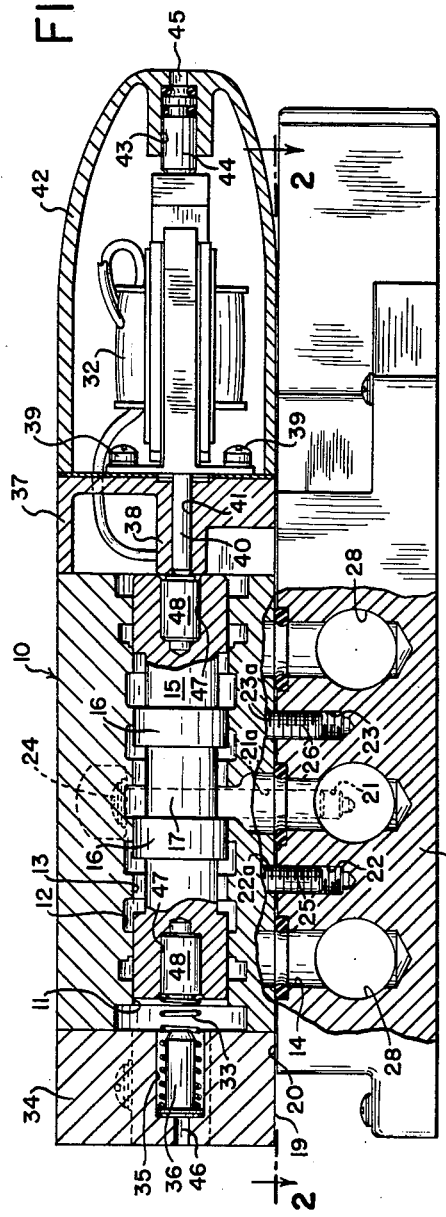
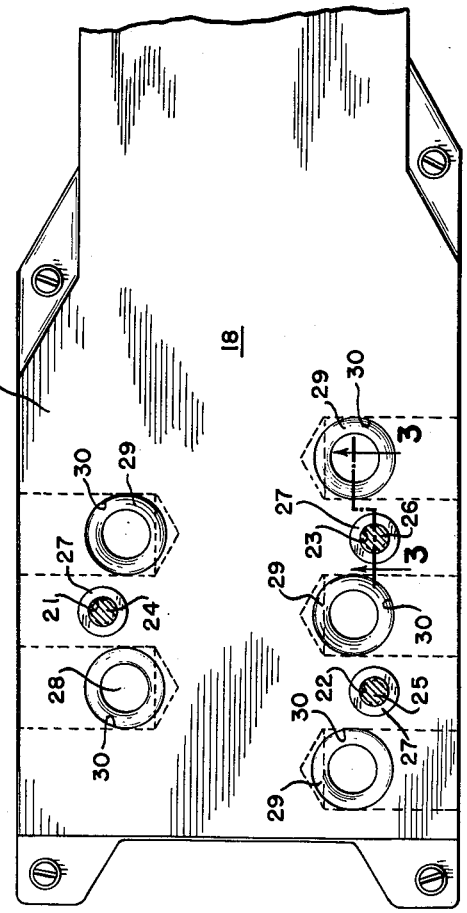
INVENTOR
Wilfred Aslan
BY
ATTORNEYS United States Patent Office 3,060,970
Patented Oct. 30, 1962

3,060,970
FLUID VALVE CONSTRUCTION
Wilfred Aslan, New York, N.Y., assignor to Alkon Products Corporation, Hawthorne, N.J., a corporation of New York
Filed Feb. 24, 1960, Ser. No. 10,709
11 Claims. (Cl. 137—625.25)

The present invention relates to fluid valves, and more particularly to improvements in the construction of fluid valves of the type having a valve spool slidable to a plurality of valving positions in a valve body.

One of the conventional forms of fluid valves comprises a valve body having a longitudinal bore therein receiving a valve spool. Cooperating lands and recesses in the valve body and on the spool form active valving surfaces whereby, upon movement of the valve spool to various operative positions, selected ports of the valves may be placed in communication in desired combinations, while other combinations of ports are sealed off. In valves of this type designed for controlling the flow of hydraulic fluids, for example, it frequently is sufficient to fit the valving spool directly into the longitudinal bore in the valve body, without the interposition of resilient seals or the like, relying upon a relatively close fit between the valve spool and body to achieve the desired valving action. This may be achieved in a hydraulic valve in a practical and economical manner, by taking advantage of the inherent viscosity and lubricating characteristics of the hydraulic fluid itself.

In the case of valves for controlling the flow of air or other gases, however, the viscosity of the fluid is extremely low and its lubricating characteristics sufficiently limited to render it difficult to provide a valve structure, suitable for mass production, in which the metal-to-metal contact between the valve spool and the valve body may be relied upon to effect sealing. Accordingly, it is quite conventional, in valves for controlling the flow of air and other gases, to provide O-rings or other resilient sealing elements to assure effective valve operation while accommodating production manufacturing tolerances.

The use of O-rings or other resilient seals does not provide a wholly satisfactory solution, however, since the use of resilient sealing elements results in substantial resistance to movements of the valving spool, and hence requires excessive actuating force. Attempts to avoid excessive actuating forces frequently involve mounting the sealing element loosely, in which case there arises a collateral problem of blowing the resilient seal out of its seat during movements of the valving spool.

It now appears commercially feasible to avoid the use of resilient sealing elements entirely in air valves and the like by forming the valve body and spool of a material such as aluminum and treating the active surfaces of the relatively movable parts to a condition of exereme hardness. Since the manufacture of the spool and valve body is carried out using turning and boring techniques, very close tolerances may be observed, even in production manufacture, and the hardened active surfaces of the aluminum parts has been found sufficiently resistant to wear that a valve thus constructed may have a long, effective operating life.

One of the important considerations in the manufacture of an air valve or the like, in which resilient seals are omitted, is the provision of extremely small clearances between the valving spool and valve body. Accordingly, one of the substantial problems encountered in connection with the practical application of valves of this type resides in the fact that, when a complete valve unit is assembled and/or when a valve assembly is mounted at the site of its ultimate use, slight distortions may occur in the valve body (which is made of aluminum and therefore is readily easily distortable). Such distortions, even though slight, will cause the valve parts to bind and/or lose its sealing effectiveness.

As one of the principal features of the invention, a novel air valve assembly is provided, including a valve body and spool having substantial metal-to-metal valving contact, which incorporates novel arrangements for avoiding distortions of the active valve parts during assembly or mounting of the valve. More specifically, the new valve assembly comprises a valve body and spool, a base for mounting the valve body, and means forming, in effect at least, a tripod support and connection between the valve body and base. The arrangement is such that, under all conditions, a single plane of support is provided for the valve body, and this insures that, under all contemplated conditions, the valve body will be free of distorting forces after assembly and/or mounting.

In one advantageous form of the invention, the valve body has a substantially flat bottom surface arranged to be mounted in face-to-face relation with the substantially flat top surface of a valve base member. Three triangularly arranged, aligned bolt holes are provided in the valve body and base, whereby one part may be secured to the other. In addition, and as an important feature of the invention, small spacer means are provided adjacent the three bolt holes, so that the opposed, flat surfaces are spaced slightly apart and the only contact between the valve body and base is in the immediate area of the spacer means. Advantageously, the spacer means may be in the form of thin washers or bosses. Porting connections between the valve body and base are sealed by O-rings, for example, received in one of the members and projecting somewhat above its surface so as to be compressed when the valve parts are assembled.

An improved valve structure incorporating the novel features described above advantageously is formed of aluminum, provided with super-hard active surfaces enabling close-tolerance fits, long operating life, low inertia in moving parts and other features of advantage. In a solenoid-operated valve of this type, incorporating a valving spool formed of aluminum, the rapid actuation of the plunger between its various valving positions and the engagement of the spool with positive abutment means at such valving positions tends to cause deformation or "mushrooming" of the ends of the spool which, although having hardened outer surfaces, is relatively soft internally. Accordingly, as a related, specific feature of the invention, a valve of the general type above described is provided which incorporates a valving spool formed of aluminum or other relatively soft material and which is provided at each end of such spool with semi-resilient, impact absorbing inserts positioned to engage abutments upon movement of the spool into its operative valving positions. Advantageously, the impact absorbing elements, sometimes referred to herein as spool bumpers, are of generally cylindrical form and are composed of a plastic material such as nylon. The arrangement is such that forces involved in decelerating the valving spool, upon engagement with a fixed abutment, are partially absorbed and dissipated within the semi-resilient bumpers and, to the extent the forces are not dissipated, they are distributed throughout a large area of the spool in a manner to prevent permanent deformation of the relatively soft spool material.

For a better understanding of the above and other advantageous features of the invention, reference should be made to the following detailed description and to the accompanying drawing, in which:

FIG. 1 is a longitudinal, cross-sectional view of a valve assembly incorporating the features of the invention;

FIG. 2 is a cross-sectional view taken generally along line 2—2 of FIG. 1;

FIG. 3 is an enlarged, fragmentary, cross-sectional view taken generally along line 3—3 of FIG. 2; and FIG. 4 is an enlarged, fragmentary, cross-sectional view similar to FIG. 3, illustrating a slightly modified form of the invention.

Referring now to the drawing, the reference numeral 10 designates generally a valve body, advantageously formed of a material such as 6061–T6 aluminum. The valve body 10 may be in the form of a relatively simple block provided with a longitudinal bore 11 and annular recesses 12 forming valving lands 13. The active valving and sealing surfaces of the body 10, constituted by the lands 13, advantageously are treated to a condition of super-hardness, by techniques well known in themselves. Various ports, such as illustrated at 14, are provided in the valve body, leading to the various recesses 12, in accordance with well-known considerations, so that certain of the recesses communicate with a source of gas under pressure, other recesses communicate with a fluid motor, such as a cylinder (not shown), while still other ports communicate with exhaust.

Slidably received in the bore 11 of the valve body is a valving spool 15, advantageously formed of a material similar to that used in the body 10. The spool 15 is cylindrical in form and is provided with a plurality of annular lands 16 and recesses 17. The outer surfaces of the lands 16 are treated to a condition of super-hardness and are precision machined to fit very closely with the lands 13 of the valve body, whereby effective valving action may be achieved without the use of resilient sealing elements, such as O-rings.

Effective operation of a valve comprised of surface hardened aluminum body and spool members, utilizing substantial metal-to-metal sealing contact and eliminating entirely the use of resilient sealing elements, requires extremely precise initial machine work, in order to obtain the low clearances necessary to contain a gas, as distinguished from a hydraulic fluid, for example. Such precision is not difficult of obtainment in manufacture, since the critical areas are surfaces of revolution, which are readily formed with precision machines. However, it has proven extremely difficult, in the past, to obtain an operative valve assembly, utilizing such a construction, since the slightest distortion of the valve body, during its mounting to a base part or machine frame, for example, will cause the spool to bind so that, if the valve works at all, it will wear out rapidly.

In accordance with one of the important aspects of the invention, novel arrangements are provided for mounting the valve body 10 to a base member, which may form part of the overall valve assembly or may, in certain cases, be part of the machine or apparatus with which the valve is to be associated. In the illustrated form of the invention, a base part 18 is provided, which forms part of the valve assembly and contains suitable porting for connection to pressure fluid and exhaust lines, as well as to terminals of a fluid motor.

Advantageously, the valve body 10 is provided with a flat bottom surface 19 substantially complementary to a substantially flat upper surface 20 of the valve base 18. As shown best in FIG. 2, the valve base 18 is provided with three triangularly related tapped holes 21–23 aligned with similar untapped holes 21a–23a in the valve body 10. Three bolts 24–26 are received in the holes 21a–23a and 21–23 and constitute substantially the sole structural interconnection between the valve body 10 and the base 18.

In accordance with the invention, the supporting engagement between the valve body 10 and base 18 is in the nature of a tripod. Ideally, the tripod support would be comprised of three points, which could define but a single plane. Under such circumstances, securing the valve body 10 at the three points of support could not result in distortion of the valve body. In practice, such ideal, "point" support is incapable of attainment. However, it is closely approximated, in accordance with the invention, by providing about each of the connecting bolts 24–26 annular spacer means of limited area, which separate the principal facing surfaces of the valve body and base and constitute the only areas of support.

In the form of the invention illustrated in FIGS. 1–3, the annular spacer means take the form of thin, annular washers 27 (FIG. 3), which may be on the order of 0.003 inch in thickness. The three washers 27, being concentric with the bolts 24–26, constitute three triangularly related areas of limited size, in relation to the overall area of the valve body and base, thus constituting the closest practical approach to the theoretically ideal three-point support. Moreover, the annular supporting areas provided by the washers 27 immediately surround the connecting bolts, so that the compression forces exerted by the bolts are directly supported in the immediate surrounding areas of the valve body, avoiding any distorting force couples or the like.

In practice, the unique supporting and connecting arrangement of the invention so nearly approaches the theoretically ultimate, three-point support as to avoid effectively any undesirable distortions of the valve body 10 and enable the valve body and spool of a practical, long-life valve assembly to be formed of surface hardened aluminum and to be operated effectively for the control of air and other gases without the use of resilient sealing elements. This is a factor of significant practical advantage, as it not only simplifies the manufacture and assembly of the valve, but materially improves its operating characteristics and reduces required maintenance.

As illustrated clearly in FIGS. 1 and 2, suitable porting bores 28 are provided in the valve base 18 for communication with the ports 14 in the valve body. The connection between these various ports is sealed at the interface between the valve body and base by means of O-ring seals 29, received in annular recesses 30 provided at the upper ends of the ports 28 in the base. When undistorted, the O-rings 29 project above the top surface of the valve base a distance slightly greater than the spacing washers 27, so that some distortion of the O-rings, to achieve sealing, is effected when the bolts 24–26 are tightened.

In a slightly modified form of the invention illustrated in part in FIG. 4, the triangularly related areas of support surrounding the connecting bolts 24–26 are provided by integral annular bosses 31 formed either on the bottom surface of the valve body 10 or the top surface of the base 18. The dimensions of the bosses 31 may be substantially the same as those of the washers 27.

In a typical application of a valve structure incorporating the novel and advantageous features described above, the valve spool 15 is actuated between its operative valving positions by means of solenoids and springs, for example. The specific valve assembly illustrated in FIG. 1 is, as concerns its valving functions of connecting the ports in predetermined combinations, a conventional three-way valve, in which the spool is actuated in one direction (i.e., to the left) by a solenoid 32 and returned by a spring 33.

At the left hand end of the valve body 10 there is mounted an end cap 34 having an axial recess 35 therein, in which is received an abutment pin 36 and compression coil spring 33. The pin 36 is positioned such that its end surface projects inward of the end cap 34, to engage and position the spool 15 at the extreme of its leftward movement. The spring 33 is received in the recess 35, around the shank of the pin 36 and bears against the head of the pin, at one end, and against the spool 15 at the other end, simultaneously to urge the pin 36 into the recess and the spool 15 toward the right.

At the right hand end of the valve body 10 there is mounted a cap 37, which is provided in its central portion with an integral, abutment forming boss 38, the end surface of which is adapted to engage and position the spool 15 at the end of its right hand stroke. The solenoid 32 is secured to the cap 37, as by suitable screws 39 and has a plunger rod 40 projecting through an axial bore 41 in the abutment 38. Upon actuation of the solenoid 32, the plunger 40 thereof is extended to the left, beyond the end of the abutment 38, engaging the valve spool 15 and urging it to its left hand valving position, against the returning force of the spring 33. When the solenoid subsequently is de-energized, the spring 33 returns the spool and the plunger 40 to the positions shown in FIG. 1.

A suitable cover 42 encloses the solenoid 32 and is provided at its right hand end with a recess 43 receiving a pin 44. The pin 44 is accessible through a small opening 45 in the end of the cover, whereby a small instrument may be applied to the pin 44, to effect manual actuation of the solenoid where necessary or desirable. Likewise, a small opening 46 is provided in the cap 34 at the left hand end of the valve body, whereby a small instrument may be inserted to engage the abutment pin 36 for manual operation of the valve.

In normal operations of the valve, energization and de-energization of the solenoid 32 causes rapid movement of the valving spool 15 from one valving position to another, into alternative engagement with the abutment surfaces provided by the pin 36 and projection 38. Where the spool is made of a relatively soft, malleable material, such as aluminum, as is accommodated by the above-described features of the invention, the relatively substantial impact forces arising upon the sudden deceleration of the spool will tend to deform permanently the end portions of the spool and cause them to "mushroom." The consequences of this are, of course, rather significant in a valve constructed to have extremely low operating clearances between the valve body and spool surfaces.

Accordingly, as one of the subsidiary features of the invention, novel arrangements are provided for dissipating and distributing the impact forces applied to the ends of the valving spool, so that permanent deformation of the spool ends is avoided. To this end, the spool 15 is provided at each axial end with a bore or recess 47 of relatively substantial length and advantageously of greater length than diameter. Each bore receives an impact absorbing and distributing element 48, sometimes referred to as a spool bumper, which is of the same dimensions generally as the recess 47 and is formed of a semi-resilient material such as nylon. The physical outlines of the spool bumpers 48, abutment elements 36, 38, etc., are such that, as the valving spool 15 reaches the end of its stroke, contact is made only between the appropriate spool bumper and the adjacent abutment element. The impact forces thus are partially absorbed and dissipated within the semi-resilient bumper 48 and otherwise are distributed uniformly throughout a substantial area of the spool so that, at any point, the force applied to the spool material is less than that which would cause permanent deformation.

In one advantageous embodiment of the invention, the length of the spool bumper 48 is on the order of one-half inch, while the diameter thereof is on the order of three-tenths of an inch. Bumpers of the specified dimensions, formed of FM-10001 heat treated nylon have been found to achieve the sought-for results in a valving spool formed of 6061-T6 aluminum, whose major diameter is on the order of three-quarters of an inch and whose cylindrical, end bearing areas are on the order of six-tenths of an inch in length. As shown in FIG. 1, the length of the spool bumpers 48 is considerably greater than the stroke of the spool. This is advantageous in that it positively prevents the bumpers from falling out of their recesses.

The new valve construction is incorporated to substantial advantage in valves used for controlling the flow of air or gas, as the novel tripod mounting arrangement for the valve body permits the practical use of metal-to-metal sealing surfaces. It is thus possible to eliminate completely the use of O-rings, or other resilient elements in the relatively moving valving parts, avoiding simultaneously the substantial operating friction caused by such resilient sealing elements and the recurrent maintenance problems arising from wear or dislodgment of the elements, etc. The use of the novel tripod mounting arrangement, in conjunction with the use of semi-resilient, impact absorbing and dissipating spool bumpers, permits the valving spool, as well as the valve body, to be made economically of surface hardened aluminum, so that substantial operating and production advantages may be realized.

It should be understood that the specific forms of the invention herein illustrated and described are intended to be representative only, as certain changes may be made therein without departing from the clear teachings of the disclosure. Accordingly, reference should be made to the following appended claims in determining the full scope of the invention.

I claim:
1. A fluid valve comprising, a valve body formed of distortable material having a longitudinal bore therein and valve ports communicating with said bore, a valve spool received slidably in said bore and movable to a plurality of operative valving positions to connect said valve ports in predetermined combinations, cooperating valving surfaces on said valve body and spool for sealing off certain ports from certain other ports in the various operative positions of said spool, a valve base means to secure said base to said valve body comprising three tension fastening elements arranged in triangular configuration and extending between said valve body and base for drawing said valve body toward said base, and rigid spacing means immediately adjacent said fastening elements and disposed between said valve body and base, said spacing means being of limited area with respect to the size of said valve body and forming the sole contact between said valve body and base, said spacing means being of triangular configuration to provide, in substantial effect, a tripod contacting engagement between said valve body and base.

2. The fluid valve of claim 1, in which said spacing means are disposed generally in surrounding relation to respective ones of said fastening elements.

3. The fluid valve of claim 1, in which said valve body and base are provided with communicating fluid passages, one of said body and base members is provided with annular recesses surrounding openings into said passages, and O-ring seals are received in said recesses and project partially above the surface of said one member to form a fluid-tight passage seal when said members are secured together.

4. A fluid valve comprising, a valve body formed of distortable material having a longitudinal bore therein and valve ports communicating with said bore, a valve spool received slidably in said bore and movable to a plurality of operative valving positions to connect said valve ports in predetermined combinations, cooperating valving surfaces on said valve body and spool for sealing off certain ports from certain other ports in the various operative positions of said spool, a valve base engaging said valve body, rigid contacting means between said valve body and base forming three areas of contact of limited size in relation to the size of said valve body and base, said contacting means being arranged in triangular configuration to form, in substantial effect, a tripod contacting engagement between said body and base, and tension fastening means immediately adjacent to said rigid contacting means for drawing said valve body toward said base and for maintaining said contacting engagement between said valve body and base.

5. The fluid valve of claim 4, in which said contacting means comprises three washers, and said securing means comprises three bolts extending between and engaging said valve body and base and passing through respective ones of said washers.

6. The fluid valve of claim 4 in which said contacting means comprises three annular bosses projecting slightly from the principal mating surface of one of said valve body and base, and said securing means comprises three bolts extending between and engaging said valve body and base and passing through respective ones of said annular bosses.

7. A fluid valve comprising, a valve body formed of aluminum and having a longitudinal bore therein, a valve spool of aluminum received slidably in said bore and movable to a plurality of operative valving positions to connect said valve ports in predetermined combinations, cooperating valving surfaces on said valve body and spool for sealing off certain ports from certain other ports in various operative positions of said spool, said valving surfaces being closely machined from said body and spool and being hardened to provide precise sealing contact between said surfaces, a valve base engaging said valve body, rigid contacting means between said body and base forming three areas of contact of limited size in relation to the size of said body and base, said contacting means being arranged in triangular configuration to form, in substantial effect, a tripod contacting engagement between said valve body and base, and tension fastening means immediately adjacent to said rigid contacting means for drawing said valve body toward said base and for maintaining said contacting engagement between said valve body and base,.

8. The fluid valve of claim 7, in which said valve body and spool are formed of aluminum, abutment means are provided at opposite ends of said valve body to limit movements of said spool, said spool is provided at its ends with axial recesses opposite said abutment means, and semi-resilient spool bumpers are received in said recesses and positioned to engage said abutment means upon movement of the spool to limit positions, whereby to absorb and distribute forces of impact resulting from deceleration of said spool.

9. A fluid valve comprising, a valve body formed of distortable material and having a longitudinal bore therein, a valve spool received slidably in said bore and movable to a plurality of operative valving positions to connect said valve ports in predetermined combinations, cooperating valving surfaces on said valve body and spool for sealing off certain ports from certain other ports in various operative positions of said spool, and mounting means for said valve body comprising a valve base and forming three contacting areas of relatively small area in relation to the area of said valve body, said contacting areas being arranged in triangular configuration and forming, in substantial effect, a tripod support, said valve base being provided with fluid passages and having passage openings at one surface for communication with passages in said valve body, said valve body and base being secured together and being maintained substantially in separated relation by said contacting areas, and annular sealing rings are compressed between said valve body and base in surrounding relation to respective ones of said passage openings to form fluid seals and provide sealed connecting passageways between passages in said valve body and base.

10. A fluid valve comprising a valve body having a longitudinal bore therein, a valve spool formed of aluminum received slidably in said bore, said valve spool having hardened outer surfaces and being relatively soft internally such that said spool is distortable by localized impact forces, abutment means at the ends of said bore to limit movements of said spool therein, said spool having axial recesses in its ends, and semi-resilient spool bumpers each having a greater length than the stroke of said valve spool received in said recesses and positioned to engage said abutment means upon movement of the spool to limit positions, whereby to absorb and distribute impact forces resulting from deceleration of said spool.

11. The fluid valve of claim 10, in which said spool bumpers are formed of a material having properties characteristic of nylon.

References Cited in the file of this patent

UNITED STATES PATENTS

| | | |
|---|---|---|
| 2,043,194 | Eggleston | June 2, 1936 |
| 2,409,517 | Schmit | Oct. 15, 1946 |
| 2,805,404 | Voss | Sept. 3, 1957 |
| 2,868,226 | Griswold | Jan. 13, 1959 |
| 2,886,063 | Ray | May 12, 1959 |
| 2,891,517 | Towler | June 23, 1959 |
| 2,897,288 | Wijchman | July 28, 1959 |